United States Patent
Heflin et al.

(10) Patent No.: US 7,523,890 B1
(45) Date of Patent: Apr. 28, 2009

(54) NON-PYROTECHNIC REMOTE-CONTROLLED PARACHUTE JETTISON METHOD

(75) Inventors: Mark N. Heflin, Yuma, AZ (US); James B. Stewart, Yuma, AZ (US); Samuel L. Kaesemeyer, Yuma, AZ (US)

(73) Assignee: United States of America as represented by the Secretary, Washington, DC (US)

( * ) Notice: Subject to any disclaimer, the term of this patent is extended or adjusted under 35 U.S.C. 154(b) by 0 days.

(21) Appl. No.: 11/977,096

(22) Filed: Oct. 24, 2007

(51) Int. Cl.
*B64D 17/54* (2006.01)

(52) U.S. Cl. ..................................................... 244/149

(58) Field of Classification Search .............. 244/137.3, 244/147, 149, 150, 151 B, 152
See application file for complete search history.

(56) References Cited

U.S. PATENT DOCUMENTS 3,034,750 A * 5/1962 Sieverts ...................... 244/150
3,840,988 A * 10/1974 Hoffman ...................... 30/180
3,865,333 A * 2/1975 Fielding et al. ......... 244/151 B
4,513,931 A * 4/1985 Kenzie ....................... 244/152
5,284,310 A    2/1994 Conway
5,816,535 A   10/1998 Underwood
6,578,885 B1 * 6/2003 Tillman ...................... 292/201

* cited by examiner

*Primary Examiner*—Tien Dinh
(74) *Attorney, Agent, or Firm*—Alan P. Klein

(57) ABSTRACT

A method of severing an extraction line connected between an extraction parachute and a cargo load when the cargo load fails to eject from an aircraft. The method comprises the steps of spacing a cutter from the extraction line; spring-biasing the cutter in the direction of the extraction line; mechanically restricting the cutter with restricting means from engaging and severing the extraction line; and disabling the restricting means in response to a radio signal from a transmitter on the aircraft so that the cutter is released and severs the extraction line.

4 Claims, 4 Drawing Sheets

NON-PYROTECHNIC REMOTE-CONTROLLED PARACHUTE JETTISON METHOD

BACKGROUND OF THE INVENTION

This invention relates in general to aeronautics, and more particularly, to aerial cargo unloading by parachute extraction.

In the past, airdrop cargo loads have been extracted from the aircraft by one or more 28-foot extraction parachutes. At times, the cargo has failed to be drawn from the aircraft because of human error, aircraft lock malfunction, or parachute material damage. When a failure or malfunction occurs, the extraction parachute is left trailing behind the aircraft. The parachute can generate drag forces high enough to stall the aircraft. The cargo handler must go behind the load and use a knife to manually cut the extraction line. This is an extremely dangerous and potentially life-threatening maneuver. When more than one extraction parachute is used, the aircraft must proceed to the nearest airfield for an emergency landing.

SUMMARY OF THE INVENTION

It is therefore an object of this invention to allow safe, easy release of extraction parachutes in case of an airdrop malfunction.

This and other objects of the invention are achieved by a method of severing an extraction line connected between an extraction parachute and a cargo load when the cargo load fails to eject from an aircraft. The method comprises the steps of spacing a cutter from the extraction line; spring-biasing the cutter in the direction of the extraction line; mechanically restricting the cutter with restricting means from engaging and severing the extraction line; and disabling the restricting means in response to a radio signal from a transmitter on the aircraft so that the cutter is released and severs the extraction line.

On command, the cargo handler can activate the device from any location on the aircraft and jettison the extraction parachute. No pyrotechnics are involved, so there are no restrictions imposed by the use of explosives. There are no cables to come loose and entangle with the airdrop loads or the cargo handler's feet. One low power coded EMI shielded transmitter may be used on all aircraft without risk to other aircraft flying nearby. The aircraft can carry multiple transmitters.

Additional advantages and features will become apparent as the subject invention becomes better understood by reference to the following detailed description when considered in conjunction with the accompanying drawings wherein:

DETAILED DESCRIPTION

Figure 1:
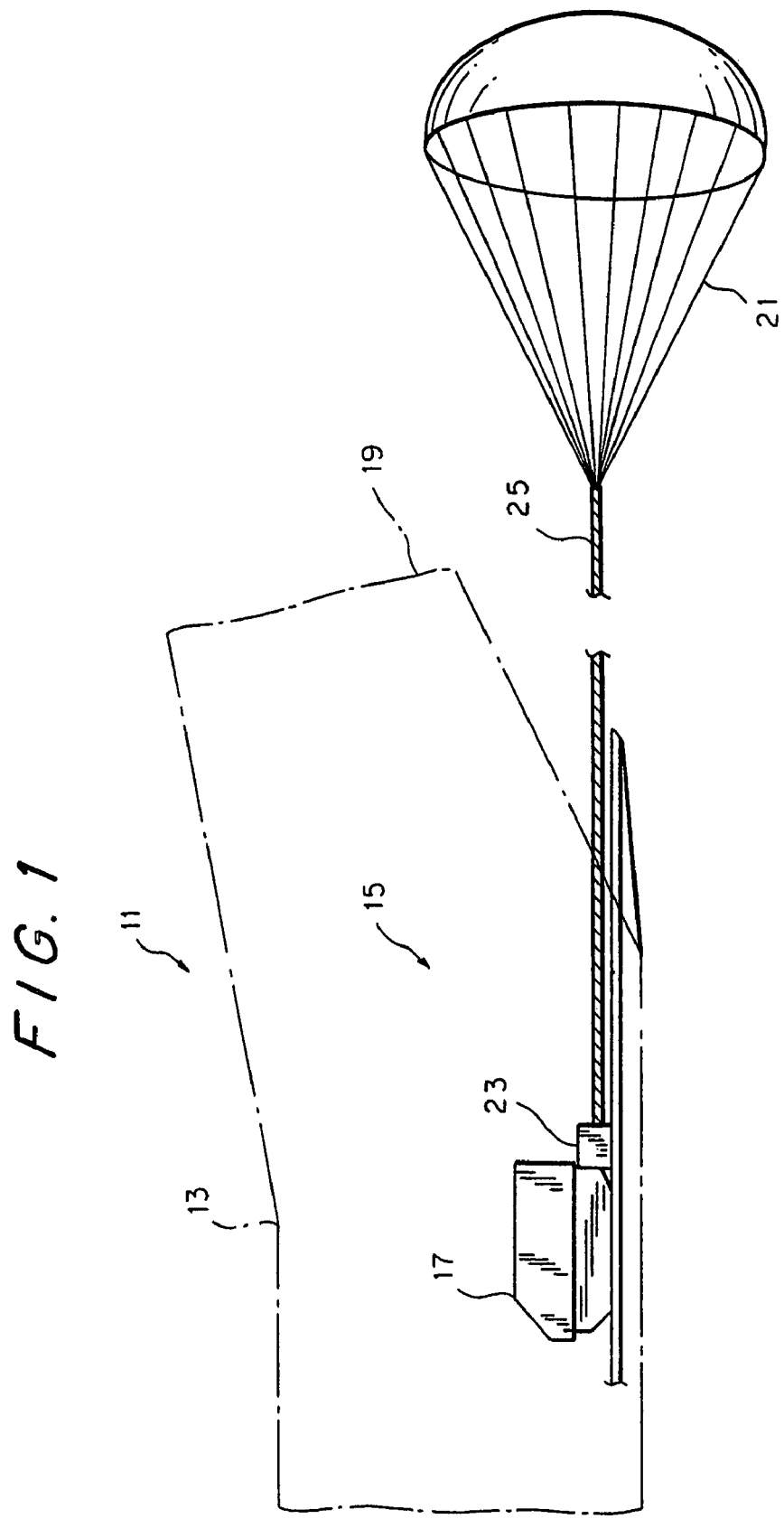
FIG. 1 is a schematic illustration of an aerial delivery system embodying the invention.

The invention as embodied in a typical aerial delivery system is illustrated in FIG. 1. An aircraft 11 includes a fuselage 13 having a cargo compartment 15 containing the airdrop cargo 17 and an open aft cargo door 19. The airdrop cargo is extracted from the aircraft by one or more extraction parachutes 21. This aerial delivery system is known in the art and its detailed operation is well known in the art. A malfunction during an airdrop delivery risks the safety of the entire crew and the aircraft itself. It is essential to be able to jettison the extraction parachute when it is outside the aircraft before the cargo load has extracted. According to the invention, a device 23 is included within the aerial delivery system for severing the extraction line 25 connected between the cargo load 17 and the extraction parachute 21 when the cargo load fails to eject from the aircraft.

Figure 2:
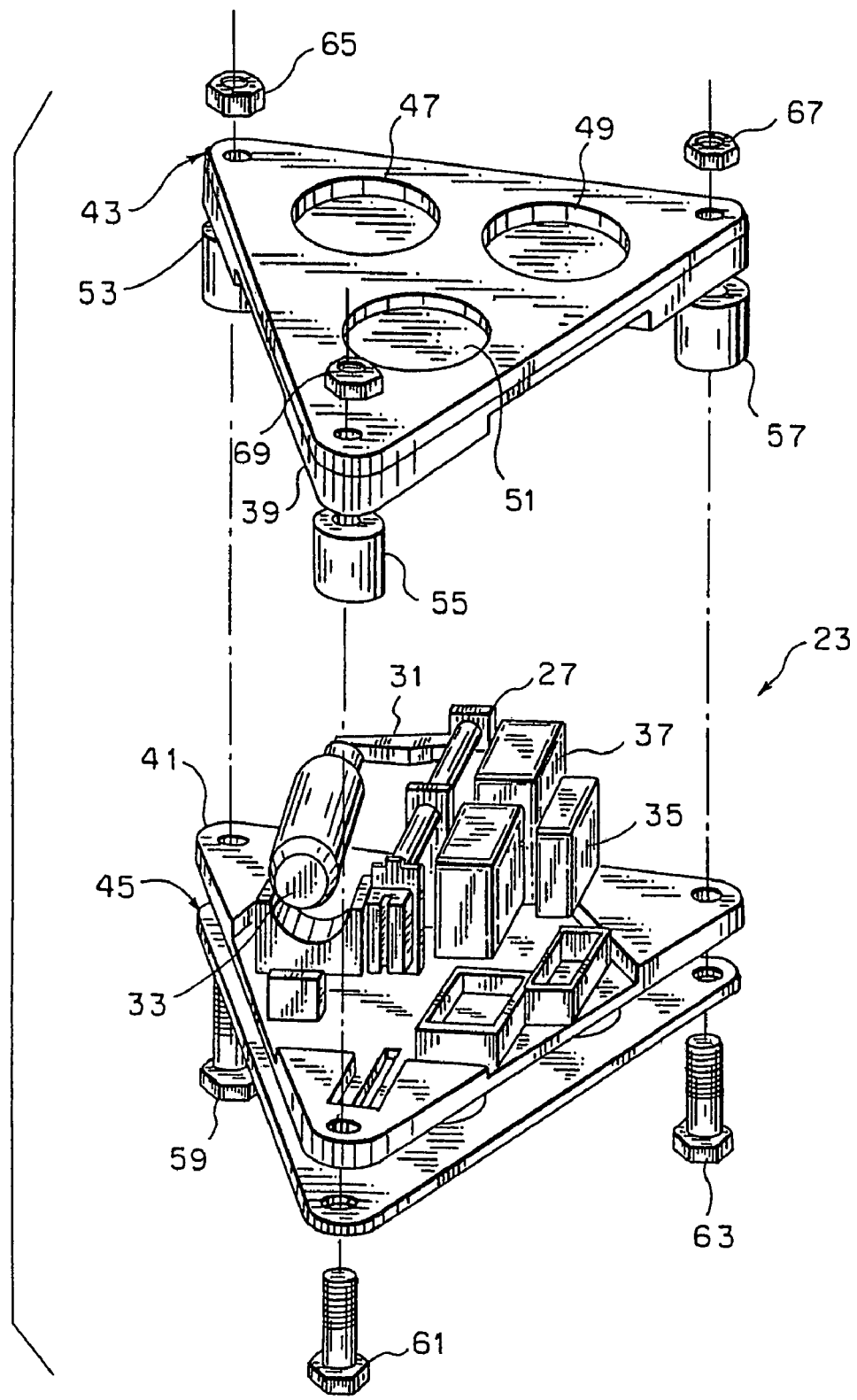
FIG. 2 is an exploded view of the severing device disconnected from the rest of the aerial delivery system of FIG. 1.
Figure 3:
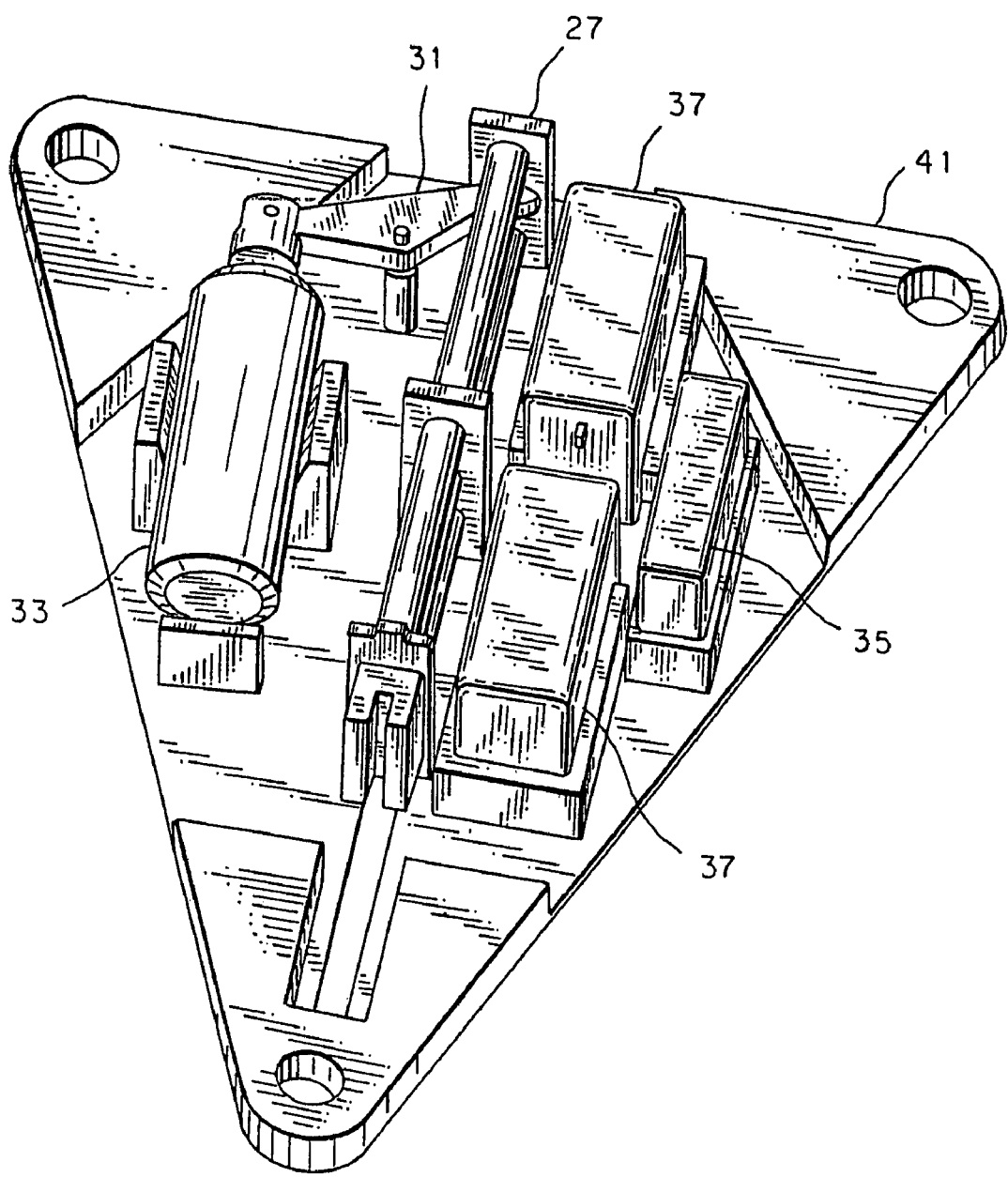
FIG. 3 shows the lower plate assembly of the device of FIG. 2.
Figure 4:
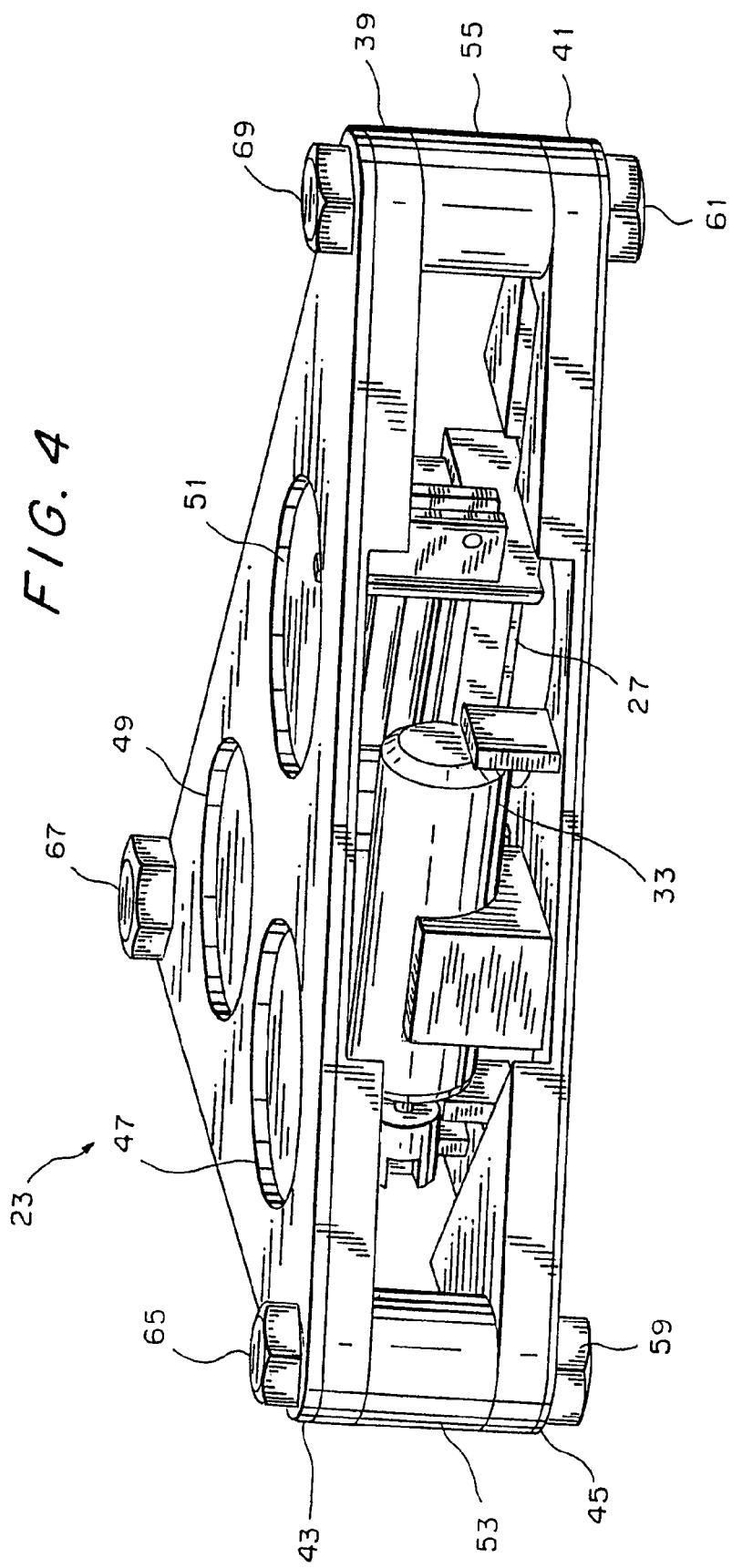
FIG. 4 is the assembled device of FIG. 2.

FIGS. 2-4, wherein like reference numerals designate like or corresponding parts, show the device 23 disconnected from the rest of the aerial delivery system shown in FIG. 1. The device 23 includes a cutter 27 spaced from and spring-biased in the direction of the extraction line 25 (the spring is not shown); a housing for the cutter; means for mechanically restricting the cutter from engaging and severing the extraction line; and means responsive to a radio signal from a transmitter on the aircraft for disabling the restricting means so that the cutter is released and severs the extraction line. While the restricting means may take a variety of forms, conveniently it may take the form shown of a pivotable trip lever 31 positioned in the way of the cutter 27. Further, while the disabling means may also take a variety of forms, conveniently it may take the form shown in the drawing of an activatable solenoid 33 connected to the trip lever, a radio receiver 35 in circuit with the solenoid, and a pair of batteries 37 in circuit with the solenoid. The housing may include an aluminum upper plate 39 and an aluminum lower plate 41; a pair of identical outer hardened steel plates 43 and 45 having a plurality of weight-reducing holes 47-51; a plurality of Teflon® spacers 53-57 for spacing the upper and lower plates; and a plurality of bolts 59-63 and nuts 65-69 for clamping the outer plates and the spaced apart upper and lower plates together, the bolts passing through the spacers and the plates. The lower plate 41 may be machined to form pockets for mounting the cutter, the restricting means, and the disabling means; and the upper plate 39 may be machined to form mounting and guiding slots for the cutter.

In operation of the device, the bolt 61 passing through the spacer 55 and plates 39-45 is removed, and the spacer 55 is removed from between the plates. Then, the extraction line 25 is attached around the spacer 55, and the spacer 55 is repositioned between the plates. Next, the cutter 27 is retracted and the trip lever 31 is positioned in the way of the cutter to mechanically restrict the cutter from engaging the extraction line 25. Finally, the bolt 61 is replaced and the nut 55 is tightened.

In the event the cargo load 17 fails to eject from the aircraft 11, the user of the device 23 transmits a radio signal from a transmitter on the aircraft to the radio receiver 35 to activate the solenoid 33. The solenoid 33 pivots the trip lever 31 out of the way of the cutter 27 so that the cutter is released and severs the extraction line 25, jettisoning the extraction parachute 21.

It is obvious that many modifications and variations of the present invention are possible in light of the above teachings. It is therefore to be understood that within the scope of the appended claims, the invention may be practiced otherwise than as described.

What is claimed as new and desired to be secured by Letters Patent of the United States is:

1. A method of severing an extraction line connected between an extraction parachute and a cargo load when the cargo load fails to eject from an aircraft, the method comprising the steps of:

spacing a cutter from the extraction line;

spring-biasing the cutter in the direction of the extraction line;

mechanically restricting the cutter with restricting means from engaging and severing the extraction line; and disabling the restricting means in response to a radio signal from a transmitter on the aircraft so that the cutter is released and severs the extraction line, wherein the restricting step includes positioning a pivotable trip lever in the way of the cutter.

2. The method recited in claim 1 wherein the disabling step includes:

transmitting a radio signal from a transmitter on the aircraft.

3. The method recited in claim 2 wherein the disabling step includes:

pivoting the trip lever out of the way of the cutter.

4. The method recited in claim 3 wherein the disabling step includes:

activating a solenoid connected to the trip lever.

* * * * *